No. 645,907. Patented Mar. 20, 1900.
F. BEDELL.
SYSTEM OF ELECTRICAL TRANSMISSION.
(Application filed July 5, 1899.)
(No Model.)

Witnesses:
Raphaël Petter
L. J. Shaw

Frederick Bedell Inventor
by E. M. Bentley, Att'y

UNITED STATES PATENT OFFICE.

FREDERICK BEDELL, OF ITHACA, NEW YORK.

SYSTEM OF ELECTRICAL TRANSMISSION.

SPECIFICATION forming part of Letters Patent No. 645,907, dated March 20, 1900.

Application filed July 5, 1899. Serial No. 722,799. (No model.)

*To all whom it may concern:*

Be it known that I, FREDERICK BEDELL, a citizen of the United States, residing at Ithaca, county of Tompkins, and State of New York, have invented certain new and useful Improvements in Systems of Electrical Distribution, of which the following is a specification, reference being made to the accompanying drawings, wherein—

Figure 1:
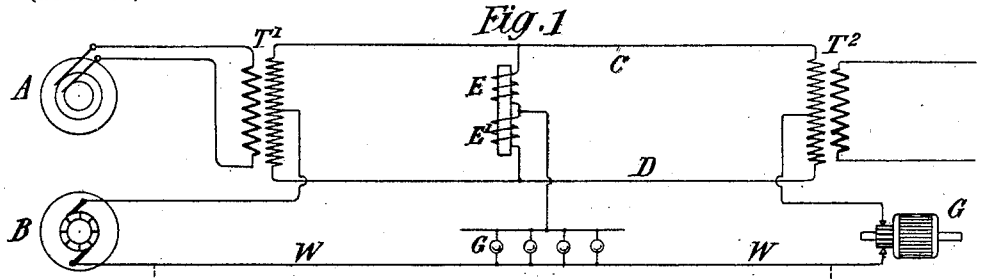
Figure 2:
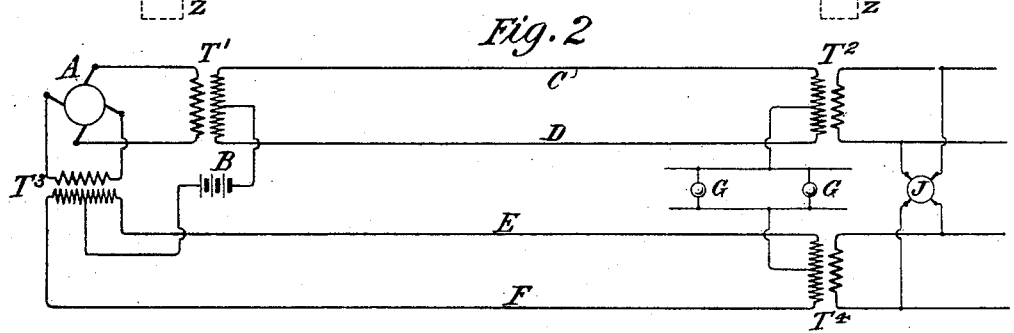
Figure 3:
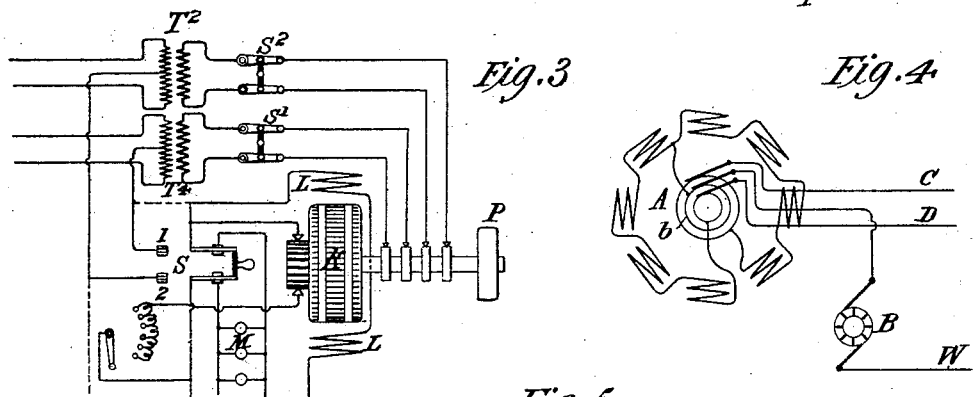
Figure 4:
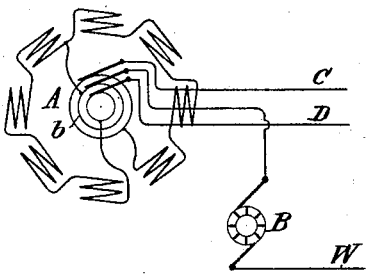
Figure 5:
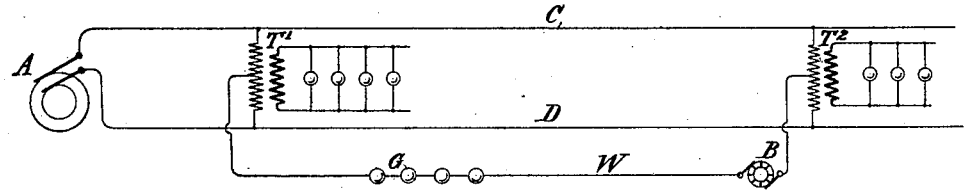
Figure 6:
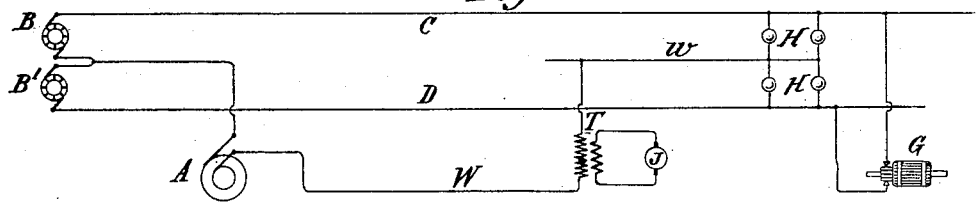

Figure 1 is a diagram illustrating my invention applied to a single-phase alternating-current system. Fig. 2 is a diagram of the same applied to a polyphase alternating-current system. Fig. 3 is a diagram of the application of my invention to the starting of a rotary converter. Fig. 4 shows a modified form of generator arrangement. Fig. 5 shows the application of a second electromotive force at intermediate points along a circuit conveying an existing current, and Fig. 6 shows the application of an alternating electromotive force to a three-wire direct-current system.

My invention relates to a method of transmitting both direct and alternating currents in a system of electrical distribution carrying a maintained electric pressure for power and lighting purposes over the same system of conductors and utilizing either the direct or alternating current, or both, at any receiving-point on the line.

By means of my invention a direct current can be introduced at any point into the conductors of any alternating system, and without interference with the operation of the alternating-current apparatus the direct current may be taken from the same conductors at any point along the line and utilized either separately or in conjunction with the alternating machinery. In a similar manner an alternating current may be introduced into the conductors of a direct-current system, making it possible to utilize either the direct or alternating current, or both, at any point along the line.

One of the various ways in which my invention may be utilized is the application of the direct current to a rotary converter for energizing its field-magnet coil and for starting it and bringing it up to synchronism by introducing the direct current into its field-magnet and armature coils. This is but an illustration of the advantage to be derived from my invention, and it is obvious that at any receiving-station the direct current may be applied to electric lamps, to direct-current motors, to the charging of storage batteries, to electrolytic processes, and, in brief, to any apparatus requiring direct current, while at the same time the alternating current may be applied to motors or other alternating-current apparatus simultaneously and independently of the direct current.

Referring to Fig. 1, A represents an alternating-current generator at a transmitting-station delivering its current to the primary of a transformer T', from the secondary of which proceed the line-wires C and D, which are connected at a receiving-station to the primary of transformer $T^2$, from the secondary of which the current is utilized in any desired manner. This constitutes an ordinary system of transmission by single-phase alternating currents in which a constant electromotive force or potential is maintained. To an intermediate point in the secondary winding of the transformer T', I connect one terminal of a direct-current generator B, the other terminal being connected to ground Z, as indicated by dotted lines, or to a third wire W. At the receiving-transformer $T^2$, I similarly connect the corresponding intermediate point of the primary coil to one terminal of a direct-current receiver G, which is indicated as a direct current motor, but which may be a series of arc-lamps, a storage battery, or other device utilizing direct current, the other terminal of the receiver being connected to ground or to return-wire W. It will be evident from a consideration of this arrangement that the outgoing and return conductors C and D are utilized jointly as one conductor for the direct-current system, the other being the ground Z or return-line W. Moreover, the line W will be entirely neutral as regards the alternating current, since it is connected at each end to points of equal potential, like the central conductor of a balanced three-wire system, and the only electromotive force thereon will be that produced by the generator B. The direct current will divide equally between the conductors C and D and will not disturb in any way the ultimate action of the alternating current passing in the same conductors.

Another point of much importance is that the direct current branches in opposite directions through the transformer-coils, and hence exerts no magnetizing action thereon. Were it not for this the direct current would tend to saturate the iron of the transformers and so interfere materially with their action.

At points where it is desired to take off direct currents only two choking-coils E and E', wound upon a common iron core, will be connected across the mains C and D, which coils will have low resistance and high self-induction, so that they will effectually prevent the passage of an appreciable amount of any alternating current from one conductor to the other, but will present no great resistance to the direct current passing from the lines C and D to an intermediate point between the two coils, whence, in the manner already described, it will be delivered to direct-current-receiving devices G, which are connected on the other side to the ground or return-wire W. In this case also the direct current has no magnetizing effect upon the iron of the choking-coils and so does not affect the self-inductive or choking action of the coils.

The expedient of employing choking-coils to prevent the flow of alternating current and at the same time admit the flow of direct current I do not intend to claim, broadly, in the present application, wherein I claim as new the differential use of choking-coils as employed in my method of deriving or applying direct electromotive force at intermediate points in a transmitting or receiving coil of an alternating-current system of power or light distribution, which are points of equal and maintained potential so far as regards the alternating-current system, and from which, moreover, the direct current may pass differentially through the said coils, so as to neutralize the magnetizing effect of the direct current on the iron core of the coils. It also illustrates the possibility of deriving direct electromotive force from the line without at the same time taking off an alternating electromotive force.

In cases where it is desirable to connect the alternator A directly to line conductors C D without interposing transformer T' the direct-current generator B may be connected to a brush bearing upon a collector-ring $b$, connected to an intermediate point of the armature of A, as shown in Fig. 4.

Direct current may be introduced into the system at any station other than the station of the alternating-current generator A. Thus in Fig. 5 the direct-current generator B is connected to an intermediate point in transformer $T^2$ and operates the direct-current-translating devices G, which are connected by the wire W to an intermediate point of transformer T'.

Referring to Fig. 2 of the drawings, I have indicated therein a polyphase system in which alternating currents of different phases are transmitted over the circuits, which include, respectively, the line conductors C D and the line conductors E F. In this case no additional conductor or ground connection is required for the transmission of direct current; but the direct-current generator B has one terminal connected to the neutral point of the secondary coil of transformer T' and its opposite terminal similarly connected to the secondary coil of transformer $T^3$. Likewise at the receiving end of the line the direct-current apparatus G is connected in like manner to the neutral points in the primary coils of the transformers $T^2$ and $T^4$. In this arrangement the lines C D will serve jointly as one conductor of the direct-current system and the lines E F will serve jointly as the other conductor. J is a polyphase motor or other suitable translating device. By this means I may in any polyphase alternating-current system apply direct-current apparatus to the same lines and without any additional conductors transmit the direct current simultaneously with the alternating.

Referring to Fig. 3, K is the armature of a rotary converter, which receives quarter-phase alternating currents from the secondary circuits of tranformers $T^2$ and $T^4$ and delivers direct current from its armature to translating devices M. From the neutral points of the primary circuits of the respective transformers direct current is taken in the manner already described under any desired pressure and applied to the field-magnet coils L of the rotary converter, if so desired, as a permanent arrangement by the connections indicated in the dotted lines. Moreover, the direct-current terminals are brought to the contacts 1 and 2 of a switch S, which may be thrown to connect the commutator-brushes of armature K to the direct-current-translating devices M, as shown in the drawings, or may be thrown to connect the brushes with the points 1 and 2, respectively. By this means the direct-current side of the armature K may at starting be connected directly with the direct-current supply and brought up to synchronous speed as a direct-current motor, when the switch S may be thrown to disconnect it from the supplied current and connect it to the direct-current load M, and simultaneously therewith the switches S' and $S^2$ may be thrown to connect up the alternating side of armature K. Mechanical power may be derived by a belt from the pulley P. This use of the direct current is simply illustrative of the various applications which may be made of my method.

Although I commonly prefer to introduce a direct current into an alternating-current system, as already described, introducing it into and taking it out from the alternating-current system at corresponding points of equal alternating potential, I do not limit myself to this form of my invention, which when preferred may be applied as in Fig. 6, in which an alternating current is introduced into a direct-current system, being introduced into and derived from such a system at points of equal potential. Thus the direct-current generator or generators B B' supply direct current to the main conductors C D and operate therefrom the direct-current motor G and the receiving devices H, which are connected to the neutral wire $w$. The alternating-current generator A is connected at the generating-station to an intermediate point between the generators B B', the alternating current then flowing through C and D, which jointly form one conductor, through the receiving devices H H to a point of intermediate potential $w$ in the direct-current system, and thence through the transformer T, which operates the alternating-current motor J, connected to its secondary, and thence through the return-wire W to the alternating-current generator A.

I have shown but not claimed herein a method of starting a rotary converter by an application of my invention, this being only for the purpose of illustrating the capacities of the invention and without prejudice to any claim I may make thereto in a separate application.

What I claim as new, and desire to secure by Letters Patent, is—

1. In a system for distributing energy by maintained electric currents, the method of transmitting maintained currents of different character over the same conductors which consists in applying at a point of given potential to conductors carrying a maintained current under constant potential a second electromotive force and withdrawing a second maintained current therefrom at a determined point of the same potential.

2. In a system for distributing maintained electric currents the method of transmitting both alternating and direct currents over the same conductors which consists in applying to conductors carrying either direct or alternating current at a constant potential a second electromotive force, either alternating or direct, at a point of given potential and withdrawing therefrom at a distant point of the same potential a second current corresponding to the applied electromotive force.

3. In a system for distributing maintained electric currents the method of transmitting currents of differing character over the same conductors which consists in applying jointly to the conductors of a constant-potential system a second electromotive force, deriving a second current from the said joint conductors at a receiving-point and returning it by an external conductor.

4. In a system for distributing maintained electric currents, the method of transmitting both alternating and direct currents over the same conductors which consists in applying a direct electromotive force to the conductors of an alternating constant-potential system acting jointly as a single conductor and at a receiving-station deriving a direct electromotive force from an intermediate point in inductive receiving apparatus connected to the conductors of said alternating system.

5. In a system for distributing maintained electric currents, the method of transmitting both alternating and direct currents over the same conductors which consists in applying a direct electromotive force to both conductors of an alternating constant-potential system and at a receiving-station deriving a direct electromotive force from an intermediate point in a coil bridging the two alternating conductors.

6. In a system for distributing energy by maintained electric currents of different character upon the same conductors, the method of avoiding the overmagnetizing effect of direct current on an alternating-current-translating apparatus which receives or delivers current of a maintained constant potential, which consists in transmitting a maintained direct current through two coils of said apparatus, the ampere-turns or magnetizing effects of said coils being equal and opposed to each other.

7. In a system for distributing maintained electric currents the method of transmitting both alternating and direct currents over the same conductors which consists in applying a direct electromotive force to the conductors of an alternating constant-potential system acting jointly as a single conductor and completing the circuit of the direct electromotive force by the conductors of a second alternating constant-potential system acting jointly as a single return-conductor.

8. In a system for distributing energy by maintained electric currents of different character upon the same conductors, the method of neutralizing the overmagnetizing effect of direct current on an alternating-current transformer which receives electrical energy at a given constant potential and delivers it at any desired constant potential, which consists in applying the direct electromotive force to an intermediate point in the coils of said transformer whereby the said overmagnetizing effect is neutralized.

9. The method of transmitting both alternating and direct currents over the same conductors which consists in applying the direct electromotive force to an intermediate point of an alternating generating-coil and deriving the direct electromotive force from a corresponding intermediate point of an alternating coil at a receiving-point in the same system.

10. The method of transmitting both alternating and direct currents over the same conductors, which consists in applying a direct electromotive force to an alternating generating-coil differentially, so as to neutralize the magnetizing effect of the direct current on the iron core of the alternating coil and impress the same direct-current polarity on both terminals of said coil.

In witness whereof I have hereunto set my hand, before two subscribing witnesses, this 12th day of June, 1899.

FREDERICK BEDELL.

Witnesses:
HORACE MACK,
THOMAS TREE.